(12) United States Patent
Jeong

(10) Patent No.: US 10,068,704 B2
(45) Date of Patent: Sep. 4, 2018

(54) SHIELDED ANTENNA TO REDUCE ELECTROMAGNETIC INTERFERENCE (EMI) AND RADIO FREQUENCY (RF) INTERFERENCE IN A WIRELESS POWER TRANSFER SYSTEM

(71) Applicant: QUALCOMM INCORPORATED, San Diego, CA (US)

(72) Inventor: Seong Heon Jeong, San Diego, CA (US)

(73) Assignee: QUALCOMM Incorporated, San Diego ( * ) Notice: Subject to any disclaimer, the term of this patent is extended or adjusted under 35 U.S.C. 154(b) by 73 days.

(21) Appl. No.: 15/190,346

(22) Filed: Jun. 23, 2016

(65) Prior Publication Data

US 2017/0372836 A1 Dec. 28, 2017

(51) Int. Cl.

| | |
|---|---|
| *H01M 10/46* | (2006.01) |
| *H01F 38/14* | (2006.01) |
| *H02J 50/12* | (2016.01) |
| *H01Q 1/52* | (2006.01) |
| *H01Q 7/06* | (2006.01) |
| *H02J 7/02* | (2016.01) |
| *H02J 7/04* | (2006.01) |
| *H01Q 1/22* | (2006.01) |
| *H02J 7/00* | (2006.01) |

(Continued)

(52) U.S. Cl.
CPC ........... *H01F 38/14* (2013.01); *H01Q 1/2208* (2013.01); *H01Q 1/526* (2013.01); *H01Q 7/06* (2013.01); *H02J 7/0044* (2013.01); *H02J 7/025* (2013.01); *H02J 7/045* (2013.01); *H02J 50/10* (2016.02); *H02J 50/12* (2016.02); *H02J 50/70* (2016.02)

(58) Field of Classification Search
CPC .. H02J 7/025; H02J 5/005; H02J 7/355; H02J 7/0042
USPC .......... 320/107, 108, 114, 115, 116; 307/104
See application file for complete search history.

(56) References Cited

U.S. PATENT DOCUMENTS

| | | |
|---|---|---|
| 2005/0057422 A1 | 3/2005 | Deguchi et al. |
| 2011/0163714 A1 | 7/2011 | Ettes et al. |

(Continued)

FOREIGN PATENT DOCUMENTS

| | | |
|---|---|---|
| WO | 2014148312 A1 | 9/2014 |
| WO | 2016003762 A1 | 1/2016 |

OTHER PUBLICATIONS

International Search Report and Written Opinion—PCT/US2017/036248—ISA/EPO—dated Sep. 14, 2017.

*Primary Examiner* — Edward Tso
(74) *Attorney, Agent, or Firm* — Smith Tempel Blaha, LLC

(57) ABSTRACT

An apparatus for wireless power transfer includes a transmit antenna configured to generate a wireless field to power or charge a load, a wireless charging area configured to receive a device to be wirelessly charged via the wireless field, the transmit antenna located outside of a periphery of the wireless charging area, and at least one shielding element overlapping the transmit antenna on a side of the transmit antenna from which the device is configured to be positioned within the wireless charging area, the at least one shielding element configured to diminish at least a portion of the wireless field such that the wireless field in the wireless charging area is stronger than the wireless field where the at least one shielding element overlaps the transmit antenna.

19 Claims, 13 Drawing Sheets

(51) Int. Cl.
*H02J 50/10* (2016.01)
*H02J 50/70* (2016.01)

(56) References Cited

U.S. PATENT DOCUMENTS

| | | | |
|---|---|---|---|
| 2012/0050015 A1* | 3/2012 | Low | G06K 7/10158 340/10.1 |
| 2012/0112552 A1 | 5/2012 | Baarman et al. | |
| 2013/0181535 A1 | 7/2013 | Muratov et al. | |
| 2015/0054455 A1 | 2/2015 | Kim et al. | |
| 2015/0145742 A1 | 5/2015 | Cao | |
| 2015/0381239 A1 | 12/2015 | Shostak | |
| 2016/0006288 A1 | 1/2016 | Wagman et al. | |

\* cited by examiner

SHIELDED ANTENNA TO REDUCE ELECTROMAGNETIC INTERFERENCE (EMI) AND RADIO FREQUENCY (RF) INTERFERENCE IN A WIRELESS POWER TRANSFER SYSTEM

FIELD

The present disclosure relates generally to wireless power. More specifically, the disclosure is directed to mitigating electromagnetic interference (EMI) and radio frequency (RF) interference from a wireless power transmitter.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections that require cables or other similar connectors that are physically connected to a power supply. Cables and similar connectors may sometimes be inconvenient or cumbersome and have other drawbacks. Wireless power charging systems, for example, may allow users to charge and/or power electronic devices without physical, electrical connections, thus reducing the number of components required for operation of the electronic devices and simplifying the use of the electronic device. As such, wireless charging systems and methods that efficiently and safely transfer power for charging rechargeable electronic devices are desirable. While efficiently and safely transferring power for charging rechargeable electronic devices, it is desirable to minimize the amount of electromagnetic interference (EMI) and radio frequency (RF) interference emitted by a wireless power transmitter.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for wireless power transfer including a transmit antenna configured to generate a wireless field to power or charge a load, a wireless charging area configured to receive a device to be wirelessley charged via the wireless field, the transmit antenna located outside of a periphery of the wireless charging area, and at least one shielding element overlapping the transmit antenna on a side of the transmit antenna from which the device is configured to be positioned within the wireless charging area, the at least one shielding element configured to diminish at least a portion of the wireless field such that the wireless field in the wireless charging area is stronger than the wireless field where the at least one shielding element overlaps the transmit antenna.

Another aspect of the disclosure provides a method for wireless power transfer including generating a wireless field to power or charge a load using a transmit antenna surrounding a wireless charging area, receiving a device to be wirelessley charged via the wireless field, and diminishing at least a portion of the wireless field such that the wireless field in the wireless charging area is stronger than the wireless field outside of the wireless charging area.

Another aspect of the disclosure provides a device for wireless power transfer including means for generating a wireless field to power or charge a load in a wireless charging area, means for receiving a device to be wirelessley charged via the wireless field, and means for diminishing at least a portion of the wireless field outside of the wireless charging area such that the wireless field in the wireless charging area is stronger than the wireless field outside of the wireless charging area.

Another aspect of the disclosure provides an apparatus for wireless power transfer including a transmit coil configured to generate a wireless field to power or charge a load, a wireless charging area configured to receive a device to be wirelessley charged via the wireless field, the transmit coil located outside of a periphery of the wireless charging area, and at least one shielding element covering the coil on at least one side of the coil, the one side of the coil corresponding to a side from which receiver devices will be positioned within the charging area.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

Figure 1:
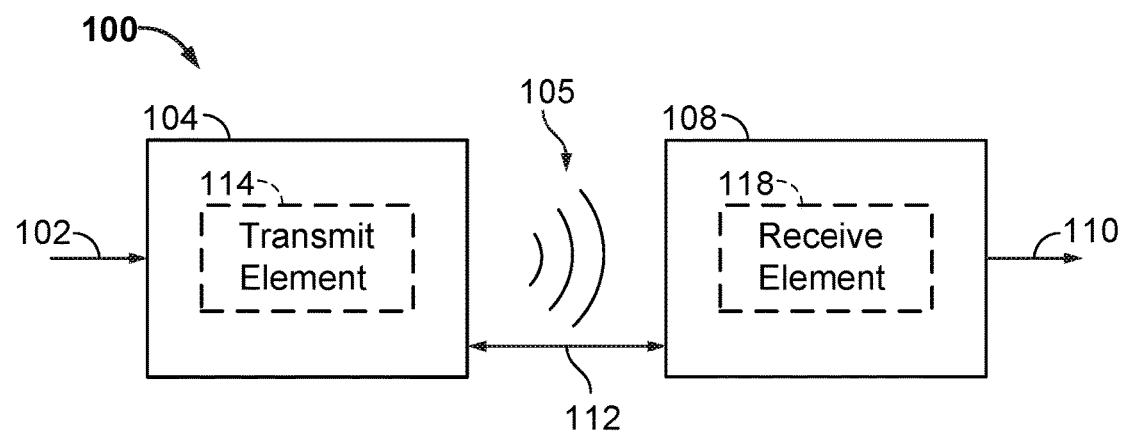
FIG. 1 is a functional block diagram of an exemplary wireless power transfer system, in accordance with exemplary embodiments.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Drawing elements that are common among the following figures may be identified using the same reference numerals.

Wireless power transfer may refer to transferring any form of energy associated with electric fields, magnetic fields, electromagnetic fields, or otherwise from a transmitter to a receiver without physical electrical conductors connecting the transmitter to the receiver to deliver the power (e.g., power may be transferred through free space). The power output into a wireless field (e.g., a magnetic field or an electromagnetic field) may be received, captured by, or coupled to by a power receiving element to achieve power transfer.

It is desirable to have the ability to efficiently and safely transfer power for wirelessly charging rechargeable electronic devices of various sizes, shapes, and form factors, while minimizing the amount of EMI and RF interference emitted by a wireless power transmitter. In an exemplary embodiment, a shielded antenna or resonator may be implemented to mitigate unwanted EMI and RF radiation from a wireless power transmitter. In an exemplary embodiment, a shielded antenna may be located separated from, away from, surrounding, or, in an exemplary embodiment, "off-center" with respect to a wireless charging area. As used herein, the term "off-center" refers to a wireless power transmit antenna or, if implemented with a capacitance, a wireless power transmit resonator, that is located away from a wireless charging area or wireless charging region, but that generates a charging field in the wireless charging area or wireless charging region. In an exemplary embodiment, coils of a transmit antenna may be located outside of, surrounding, and positioned laterally away from a charging surface on which a charge receiving device may be located. In an exemplary embodiment, the coils of the transmit antenna may partially or completely surround, or enclose, the charging surface and a wireless charging area.

FIG. 1 is a functional block diagram of an example of a wireless power transfer system 100. Input power 102 is provided to a transmitter 104 from a power source (not shown) to generate a wireless field 105 (e.g., magnetic or electromagnetic) for performing energy transfer. A receiver 108 couples to the wireless field 105 and generates output power 110 for storing or consumption by a device (not shown in this figure) that is coupled to receive the output power 110. The transmitter 104 and the receiver 108 are separated by a distance 112. The transmitter 104 includes a power transmitting element 114 configured to transmit/couple energy to the receiver 108. The receiver 108 includes a power receiving element 118 configured to receive or capture/couple energy transmitted from the transmitter 104.

The transmitter 104 and the receiver 108 may be configured according to a mutual resonant relationship. When the resonant frequency of the receiver 108 and the resonant frequency of the transmitter 104 are substantially the same, transmission losses between the transmitter 104 and the receiver 108 are reduced compared to the resonant frequencies not being substantially the same. As such, wireless power transfer may be provided over larger distances when the resonant frequencies are substantially the same. Resonant inductive coupling techniques allow for improved efficiency and power transfer over various distances and with a variety of inductive power transmitting and receiving element configurations.

The wireless field 105 may correspond to the near field of the transmitter 104. The near field corresponds to a region in which there are strong reactive fields resulting from currents and charges in the power transmitting element 114 that do not significantly radiate power away from the power transmitting element 114. The near field may correspond to a region that is within about three wavelengths, or even within about one wavelength (or a fraction thereof), of the power transmitting element 114. Efficient energy transfer may occur by coupling a large portion of the energy in the wireless field 105 to the power receiving element 118 rather than propagating most of the energy in an electromagnetic wave to the far field.

The transmitter 104 may output a time-varying magnetic (or electromagnetic) field with a frequency corresponding to the resonant frequency of the power transmitting element 114. When the receiver 108 is within the wireless field 105, the time-varying magnetic (or electromagnetic) field may induce a current in the power receiving element 118. As described above, with the power receiving element 118 configured as a resonant circuit configured to resonate at the frequency of the power transmitting element 114, energy may be efficiently transferred. An alternating current (AC) signal induced in the power receiving element 118 may be rectified to produce a direct current (DC) signal that may be provided to charge an energy storage device (e.g., a battery) or to power a load.

Figure 2:
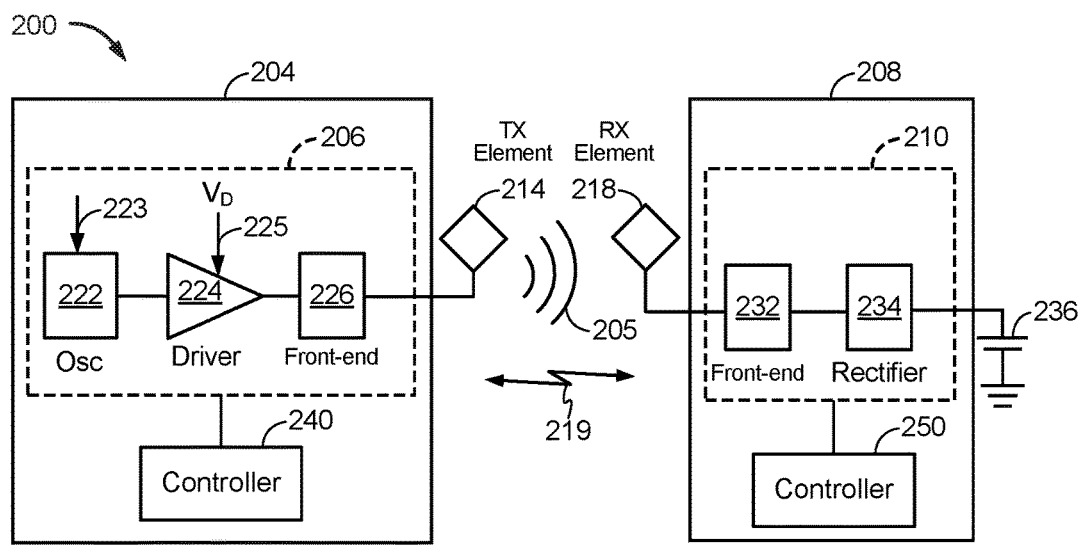
FIG. 2 is a functional block diagram of an example of a wireless power transfer system, in accordance with various exemplary embodiments.

FIG. 2 is a functional block diagram of an example of a wireless power transfer system 200. The system 200 includes a transmitter 204 and a receiver 208. The transmitter 204 is configured to provide power to a power transmitting element 214 that is configured to transmit power wirelessly to a power receiving element 218 that is configured to receive power from the power transmitting element 214 and to provide power to the receiver 208.

The transmitter 204 includes transmit circuitry 206 that includes an oscillator 222, a driver circuit 224, and a front-end circuit 226. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal 225 ($V_D$). The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 generates a wireless field 205 to wirelessly output power at a level sufficient for charging a battery 236, or powering a load.

The transmitter 204 further includes a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by the controller 240. The transmitter 204 may further include a memory (not shown) configured to store data, for example, such as instructions for causing the controller 240 to perform particular functions, such as those related to management of wireless power transfer.

Figure 3:
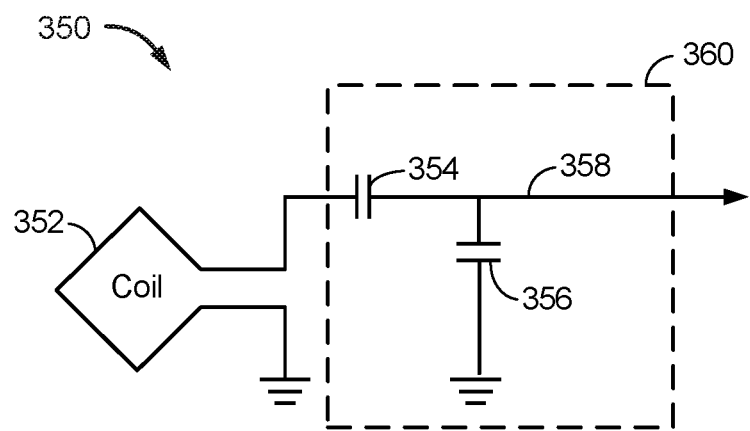
FIG. 3 is a schematic diagram of a portion of transmit circuitry or receive circuitry of FIG. 2 including a transmit or receive antenna, in accordance with exemplary embodiments.

The receiver 208 (also referred to herein as power receiving unit, PRU) includes receive circuitry 210 that includes a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 3. The receiver 208 and the transmitter 204 may additionally communicate on a separate communication channel 219 (e.g., Bluetooth®, Zigbee®, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. The transmitter 204 may be configured to generate a predominantly non-radiative field with a direct field coupling coefficient (k) for providing energy transfer. The receiver 208 may directly couple to the wireless field 205 and may generate an output power for storing or consumption by a battery 236 (or load) coupled to the output or receive circuitry 210.

The receiver 208 further includes a controller 250 that may be configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to try to reduce transmission losses between the transmitter 204 and the receiver 208.

FIG. 3 is a schematic diagram of an example of a portion of the transmit circuitry 206 or the receive circuitry 210 of FIG. 2. As illustrated in FIG. 3, transmit or receive circuitry 350 includes a power transmitting or receiving element 352 and a tuning circuit 360. The power transmitting or receiving element 352 may also be referred to or be configured as an antenna such as a "loop" antenna. The term "antenna" generally refers to a component that may wirelessly output energy for reception by another antenna and that may receive wireless energy from another antenna. The power transmitting or receiving element 352 may also be referred to herein or be configured as a "magnetic" antenna, such as an induction coil (as shown), a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356, which may be added to the transmit or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. For example, the tuning circuit in the front-end circuit 226 may have the same design (e.g., 360) as the tuning circuit in the front-end circuit 232. Alternatively, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

Figure 4:
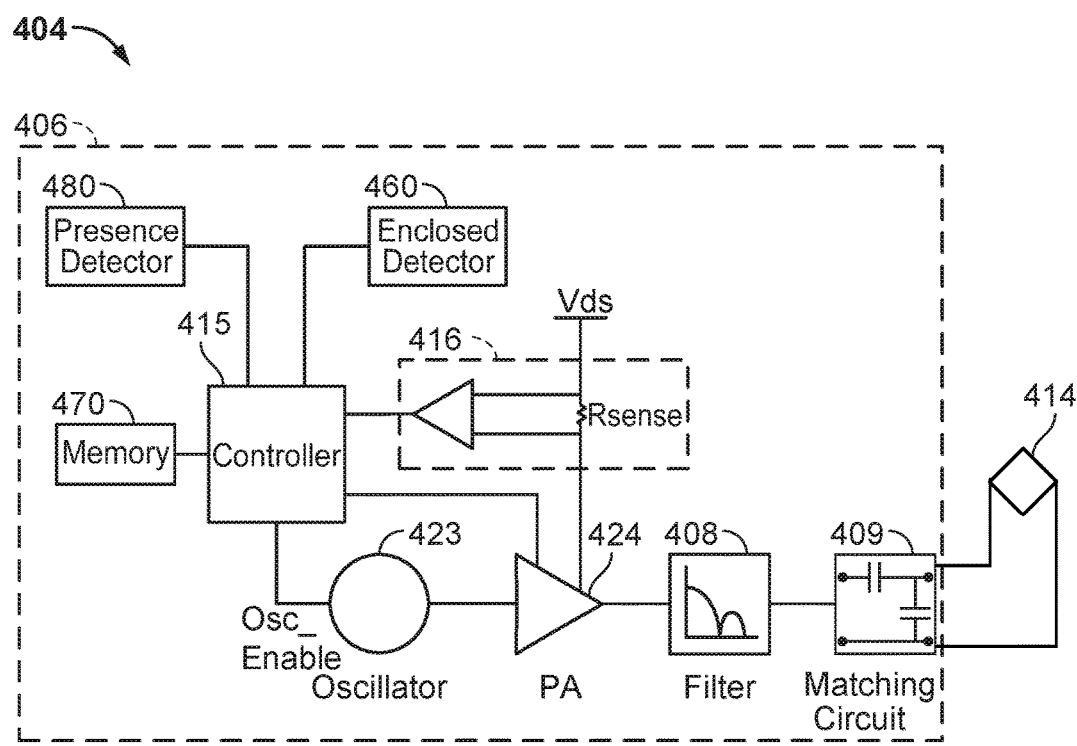
FIG. 4 is a functional block diagram of a transmitter that may be used in the wireless power transfer system of FIG. 1, in accordance with exemplary embodiments.

FIG. 4 is a functional block diagram of a transmitter 404 that may be used in the wireless power transfer system of FIG. 1, in accordance with exemplary embodiments. The transmitter 404 may include transmit circuitry 406 and a transmit antenna 414. The transmit antenna 414 may be an exemplary embodiment of the power transmitting element 114 of FIG. 1. The transmit antenna 414 may also be an embodiment of the antenna 352 as shown in FIG. 3. The transmit antenna 414 may be configured as the transmit antenna 214 as described above in reference to FIG. 2. In some implementations, the transmit antenna 414 may be a coil (e.g., an induction coil). In some implementations, the transmit antenna 414 may be associated with a larger structure, such as a pad, table, mat, lamp, or other stationary configuration. Transmit circuitry 406 may provide power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the impedance of the transmit antenna 414 and a low pass filter (LPF) 408 configured to reduce harmonic emissions to levels to prevent interference with devices and self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the transmit antenna 414 or DC current drawn by the transmitter driver circuit 424. Transmit circuitry 406 further includes a driver circuit 424 configured to drive a signal as determined by an oscillator 423. The transmit circuitry 406 may be comprised of discrete devices or circuits, or alternately, may be comprised of an integrated assembly.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as a processor. The controller may be coupled to a memory 470. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the transmitter driver circuit 424, that may be affected by the presence or absence of active receivers in the vicinity of the field generated by transmit antenna 414 as will be further described below. Detection of changes to the loading on the transmitter driver circuit 424 are monitored by controller 415 for use in determining whether to enable the oscillator 423 for transmitting energy and to communicate with an active receiver.

The transmit antenna 414 may be implemented with a Litz wire or as an antenna strip with the thickness, width and metal type selected to keep resistive losses low.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the transmitter driver circuit 424 in response to presence signals from the presence detector 480 and the enclosed detector 460. The transmitter 404 may receive power through a number of power sources, such as, for example, an AC-DC converter (not shown) to convert AC power present in a building, a DC-DC converter (not shown) to convert a DC power source to a voltage suitable for the transmitter 404, or directly from a DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the power received by the device may be used to toggle a switch on the receiver device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the wireless charging field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the transmitter driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
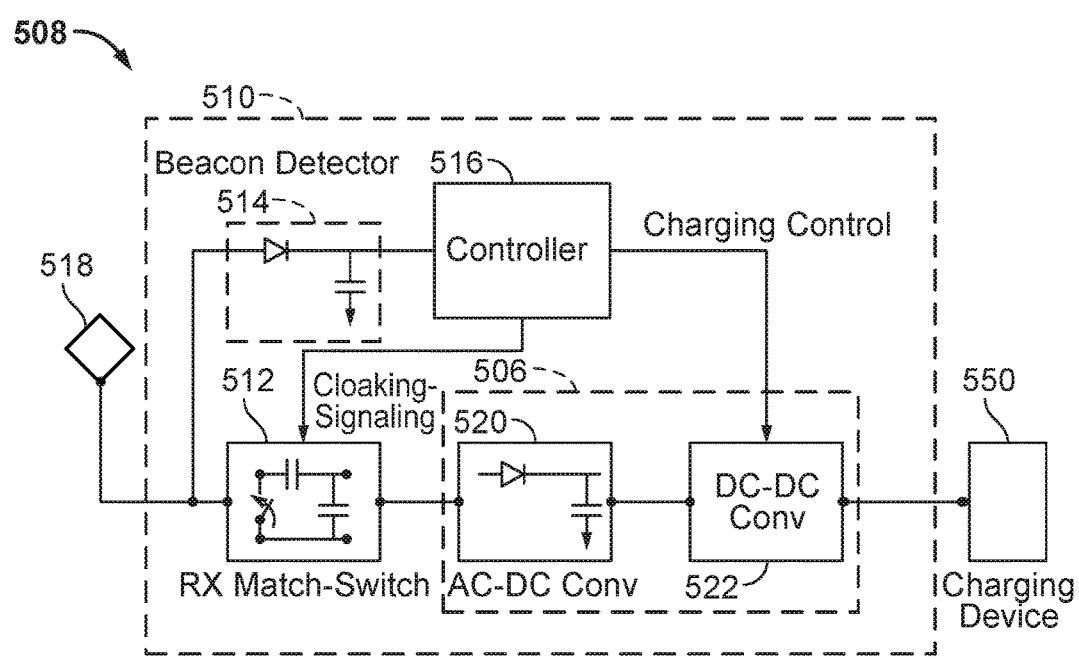
FIG. 5 is a functional block diagram of a receiver that may be used in the wireless power transfer system of FIG. 1, in accordance with exemplary embodiments.

FIG. 5 is a functional block diagram of a receiver 508 that may be used in the wireless power transfer system of FIG. 1, in accordance with exemplary embodiments. The receiver 508 includes receive circuitry 510 that may include a receive antenna 518. The receive antenna 518 may be an exemplary embodiment of the power receiving element 118 of FIG. 1. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), wearable devices, and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting received energy into charging power for use by the device 550. Power conversion circuitry 506 includes an AC-to-DC converter 520 and may also include a DC-to-DC converter 522. AC-to-DC converter 520 rectifies the RF energy signal received at receive antenna 518 into a non-alternating power with an output voltage. The DC-to-DC converter 522 (or other power regulator) converts the rectified energy signal into an energy potential (e.g., voltage) that is compatible with device 550 with an output voltage and output current. Various AC-to-DC converters are contemplated, including partial and full rectifiers, regulators, bridges, doublers, as well as linear and switching converters.

Receive circuitry 510 may further include RX matching and switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

When multiple receivers 508 are present in a transmitter's near-field, it may be desirable to adjust the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 may take place either via an "out-of-band" separate communication channel/antenna or via "in-band" communication that may occur via modulation of the field used for power transfer.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced signal energy (i.e., a beacon signal) and to rectify the reduced signal energy into a nominal power for awakening either un-powered or power-depleted circuits within receive circuitry 510 in order to configure receive circuitry 510 for wireless charging.

Receive circuitry 510 further includes controller 516 for coordinating the processes of receiver 508 described herein including the control of switching circuitry 512 described herein. It is noted that the controller 516 may also be referred to herein as a processor. Cloaking of receiver 508 may also occur upon the occurrence of other events including detection of an external wired charging source (e.g., wall/USB power) providing charging power to device 550. Controller 516, in addition to controlling the cloaking of the receiver, may also monitor beacon circuitry 514 to determine a beacon state and extract messages sent from the transmitter 404. Controller 516 may also adjust the DC-to-DC converter 522 for improved performance.

Figure 6:
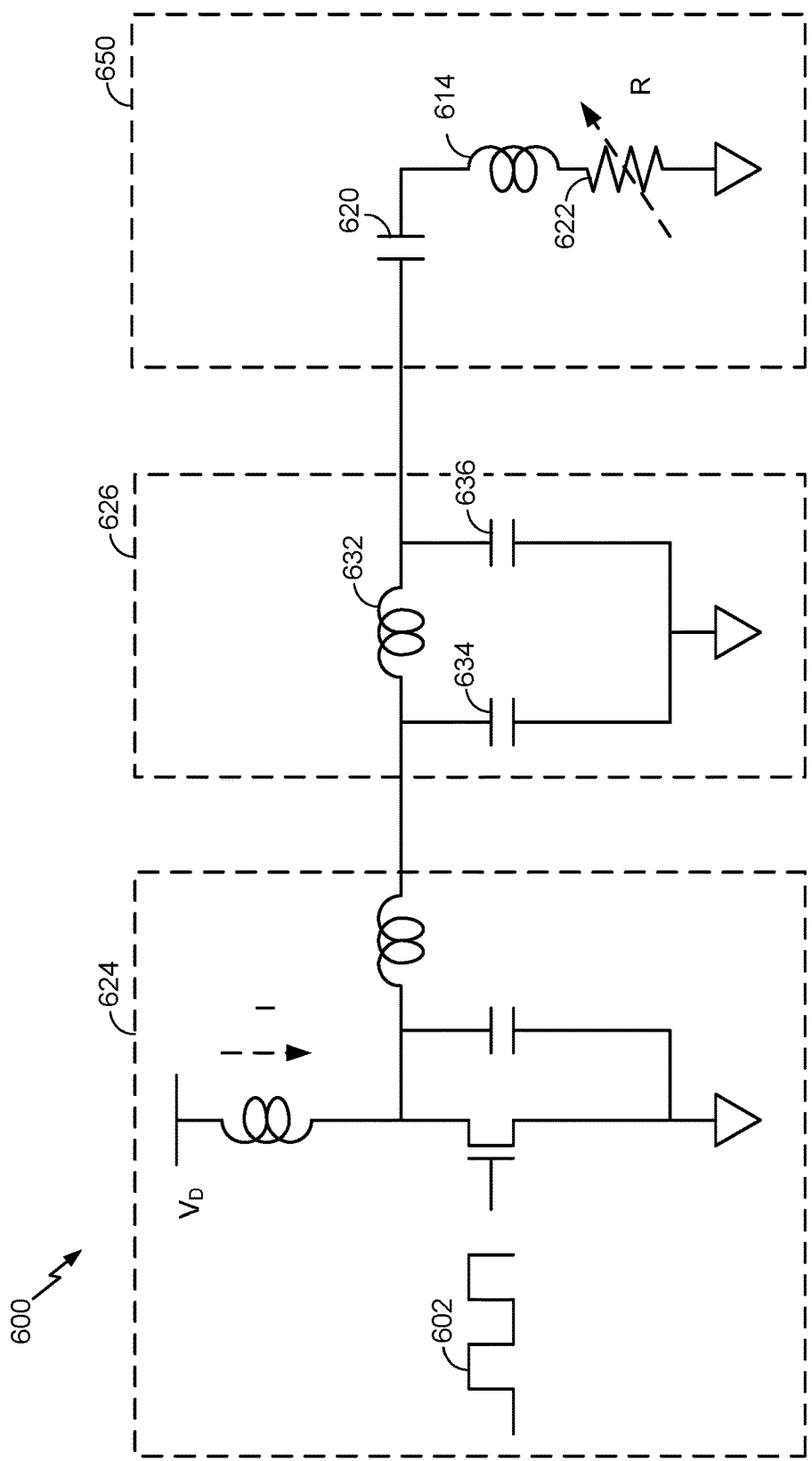
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Figure 7:
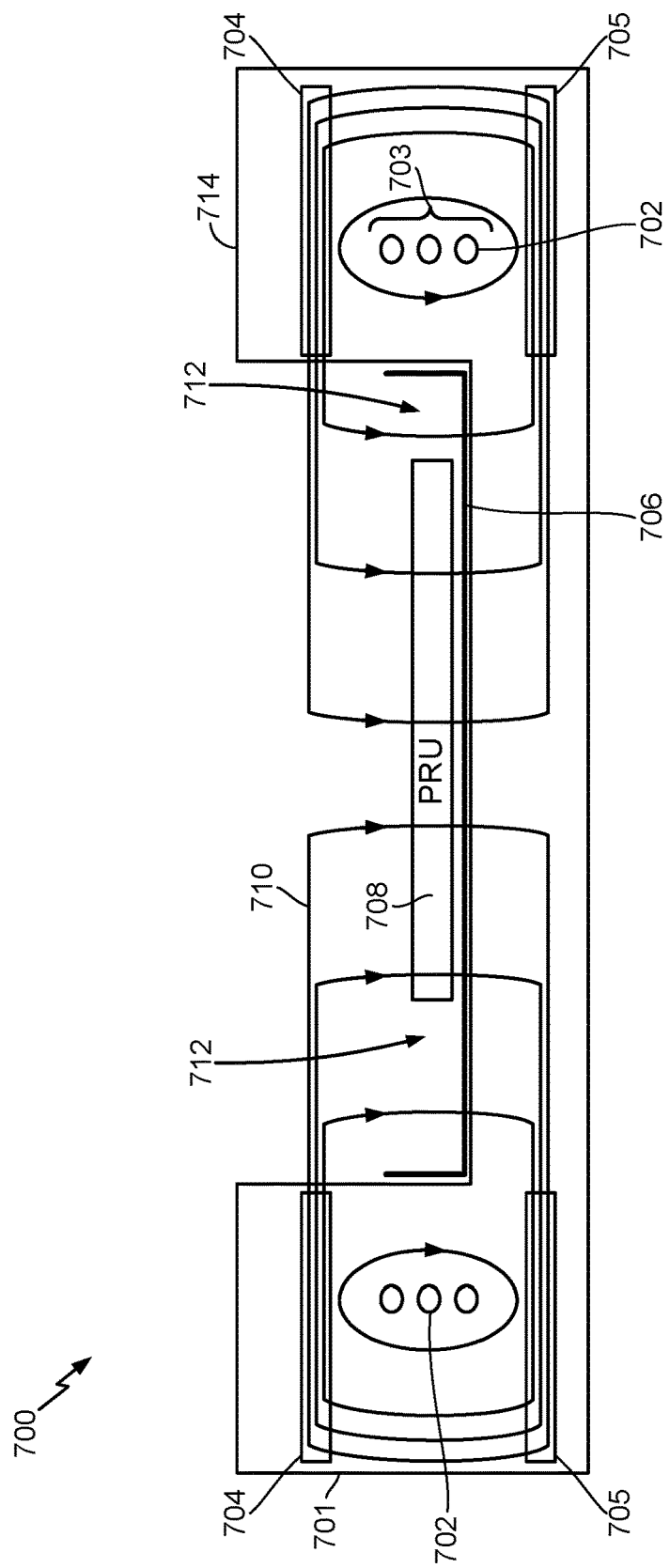
FIG. 7 is a cross-sectional schematic diagram of a wireless charging system showing an exemplary embodiment of a shielded antenna for wireless charging.

FIG. 7 is a cross-sectional schematic diagram of a wireless charging system 700 showing an exemplary embodiment of a shielded antenna for wireless charging. The wireless charging system 700 comprises a transmitter 701 (also referred to as a power transmitting unit (PTU), and a receiver 708 (also referred to as a power receiving unit (PRU). The transmitter 701 has a transmit antenna 702 comprising coils 703. In an exemplary embodiment, the coils 703 of the transmit antenna 702 are vertically oriented and are located between shielding elements 704 and 705. However, the coils 703 of the transmit antenna 702 can be oriented other than that shown. In an exemplary embodiment, vertically oriented coils may include windings that are stacked on top of each other in separate planes that may be parallel, or substantially parallel, to a charging surface 706. The shielding elements 704 and 705 may comprise one or more magnetic field (H-field) shielding elements, one or more electric field (E-field) shielding elements, or a combination of magnetic field shielding elements and electric field shielding elements. In an exemplary embodiment in which it is desirable to provide magnetic field shielding, the shielding elements 704 and 705 may comprise a magnetic shielding material, such as a ferrite material. Moreover, in this exemplary embodiment, while two shielding elements 704 and 705 are shown located above and below the transmit antenna 702, only one shielding element, either above or below the transmit antenna 702, may be implemented. In an exemplary embodiment, the shielding elements 704 and 705 magnetically shield the coils 703 of the transmit antenna 702 and limit, or diminish, the strength of the magnetic field (H-field) 710 that may be emitted from above and below the coils 703 of the transmit antenna 702. As used herein, the term "off-center" refers to the transmit antenna 702 being located away from a wireless charging area 712 and the charging surface 706 on which the PRU 708 may be located. Locating the coils 703 of the transmit antenna 702 outside a periphery of and away from the wireless charging area 712, and shielding the transmit antenna 702 with one or more shielding elements, diminishes the magnetic field emitted from the transmit antenna 702 and reduces the amount of EMI radiation and RF radiation emitted from above and below the transmit antenna 702, such that a moderate strength H-field 710 is present within the wireless charging area 712, while the EMI radiation and RF radiation emitted from above and below the transmit antenna 702 is minimized The shielding elements 704 and 705 ensure that, while diminishing the magnetic field above and below the transmit antenna 702 so as to reduce unwanted EMI radiation and RF radiation, the magnetic field in the wireless charging area 712 remains sufficiently strong to charge a receiver 708 in the wireless charging area 712.

In an exemplary embodiment, the shielding elements 704 and 705 are used to magnetically shield the transmit antenna 702 and to direct the H-field 710 substantially laterally toward the wireless charging area 712, thus reducing the amount of EMI radiation and RF radiation emitted from the coils 703 of the transmit antenna 702 above and/or below the coils 703. The number of coils or turns of the transmit antenna 702 and the number of shielding elements located above and/or below, or otherwise proximate to, the transmit antenna 702 determine the strength of the H-field 710 within the wireless charging area 712. In an exemplary embodiment, the coils 703 of the transmit antenna 702 are located outside of and positioned laterally away from the charging surface 706 and the wireless charging area 712, such that the coils 703 of the transmit antenna 702 completely surround, or enclose, the charging surface 706 and the wireless charging area 712. In an exemplary embodiment, the shielding elements 704 and 705 are located only above and below the coils 703 and are not located in the charging region 712. In an exemplary embodiment, the receiver 708, and by virtue of its being located within the receiver 708, the receive antenna (not shown), are located completely within the periphery or circumference formed by the coils 703 of the transmit antenna 702.

In an exemplary embodiment, the shielding elements 704 and 705 may be located fully or partially under or within the charging surface 706, for example, on the "bottom" of the charging surface 706, or on the side of the charging surface 706 that is adjacent to the receiver 708. In an exemplary embodiment, at least one shielding element may partially or completely cover the coils 703 of the transmit antenna 702 on at least one side of the coil or coils, where the one side of the coil or coils may correspond to a side from which the receiver 708 may be positioned within the charging area 712

In an exemplary embodiment, the receiver 708 is shown as being located recessed below an upper surface 714 of the transmitter 701. However, in alternative exemplary embodiments, the upper surface 714 may extend completely or partially over the transmitter 701 and the receiver 708 may be located over the upper surface 714 of the transmitter 701, but may still be located within a periphery formed by the transmit antenna 702.

Figure 8:
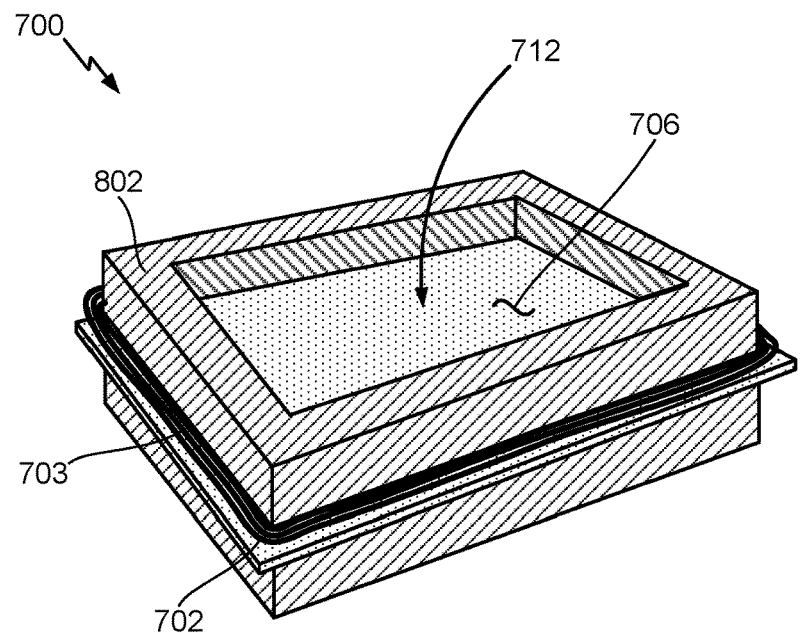
FIG. 8 is a diagram showing a perspective view of the wireless charging system of FIG. 7.

FIG. 8 is a diagram showing a perspective view of the wireless charging system 700 of FIG. 7. The diagram shows that, in an exemplary embodiment, the wireless charging area 712 can be formed, at least in part, by a support structure 802 around which the transmit antenna 702 may be wound. The support structure 802 may be configured to extend above the charging surface 706 such that the transmit antenna 702 completely encloses the wireless charging area 712 and the charging surface 706 within the coils 703.

Figure 9:
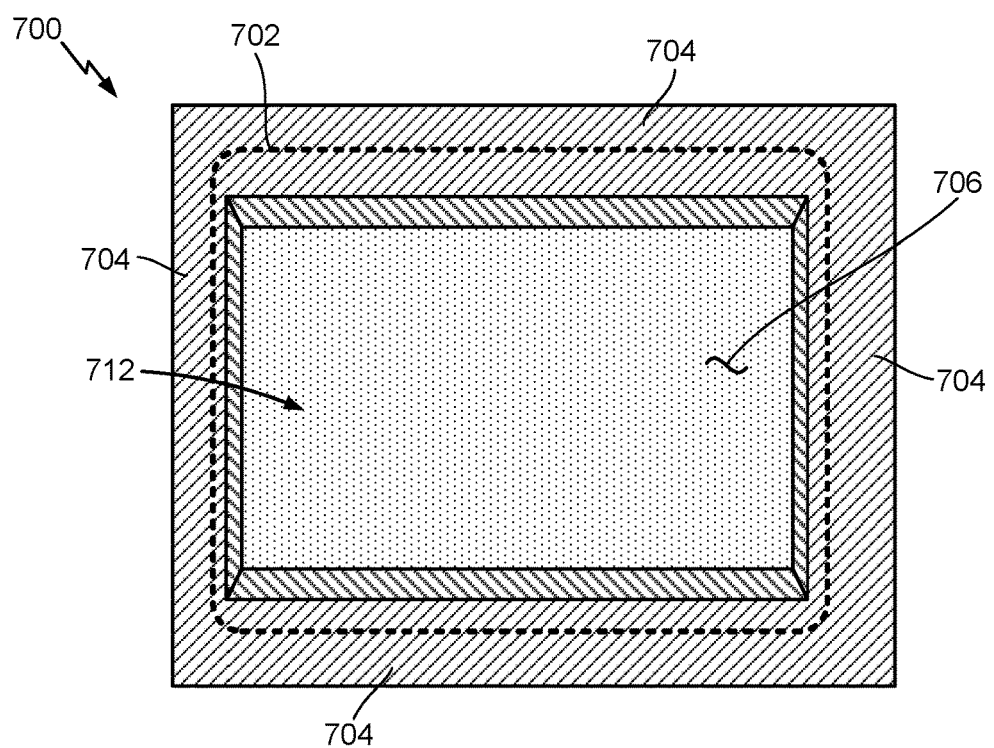
FIG. 9 is a diagram showing a perspective view of a top side of the wireless charging system of FIG. 7.

FIG. 9 is a diagram showing a perspective view of a top side of the wireless charging system 700 of FIG. 7. The diagram shows that, in an exemplary embodiment, the shielding elements 704 cover one side (the top, or upper, side) of the transmit antenna 702 while leaving the wireless charging area 712 and the charging surface 706 free of shielding material. One or more portions of the shielding element 704 can also be located on a single side or on multiple sides (e.g., left, right, or top or bottom) of the transmit antenna 702.

Figure 10:
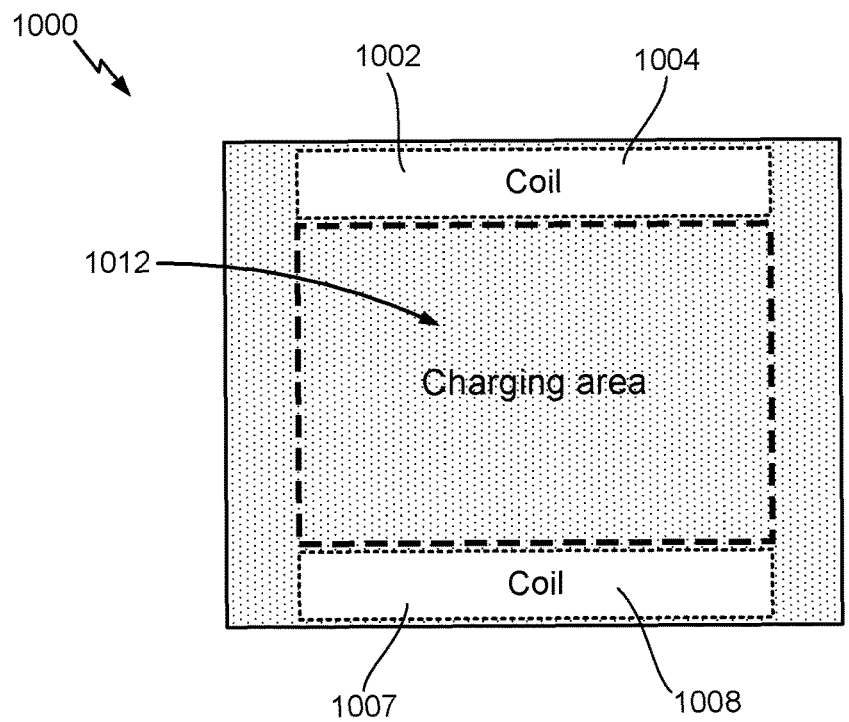
FIG. 10 is a diagram showing an exemplary embodiment of a wireless charging system having multiple transmit antennas.

FIG. 10 is a diagram showing an exemplary embodiment of a wireless charging system 1000 having multiple transmit antennas. In an exemplary embodiment, the wireless charging system 1000 comprises transmit antennas 1002 and 1007 located on two sides of and spanning a wireless charging area 1012. The transmit antennas 1002 and 1007 may be wrapped around, or otherwise supported by respective support structures 1004 and 1008 and may be coupled in series or in parallel. The transmit antennas 1002 and 1007 may be configured to generate separate magnetic fields, with one magnetic field being generated by the transmit antenna 1002 and a separate magnetic field being generated by the transmit antenna 1007. In an exemplary embodiment, the transmit antennas 1002 and 1007 may comprise two separate series-coupled coils formed from a single conductor. In an alternative exemplary embodiment, the transmit antennas 1002 and 1007 may comprise two separate parallel-coupled coils formed from separate conductors, or may comprise a single coil similar to that described in FIG. 7, in FIG. 8 and in FIG. 9. If coupled in series, the transmit antennas 1002 and 1007 may have a single or individual current driving circuit. If coupled in parallel, the transmit antennas 1002 and 1007 may have separate current driving circuits. When implemented as two separate planar or solenoidal transmit antennas 1002 and 1007, the transmit antennas 1002 and 1007 can generate a magnetic field (H-field) that covers or spans the wireless charging area 1012 by super-positioning an H-field from each transmit antenna 1002 and 1007. As used herein, the term "super-positioning an H-field" refers to two separately generated magnetic fields, one from the transmit antenna 1002 and one from the transmit antenna 1007, being constructively combined to form one magnetic field for charging or powering a receiver (not shown) in the wireless charging area 1012.

In the exemplary embodiment shown in FIG. 10, the shielding elements are omitted for clarity; however, one or more shielding elements may be implemented above and/or below one or more of the transmit antennas 1002 and 1007.

Figure 11:
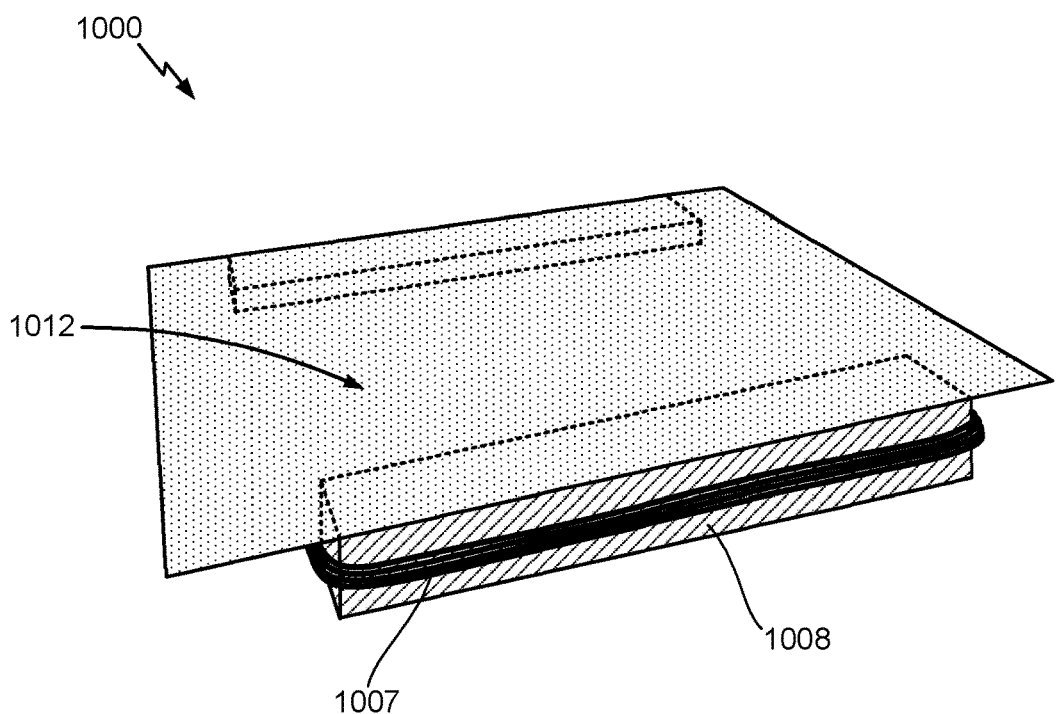
FIG. 11 is a diagram showing another view of the wireless charging system of FIG. 10.

FIG. 11 is a diagram showing another view of the wireless charging system 1000 of FIG. 10. The wireless charging system 1000 shows the transmit antenna 1007 wrapped around the support structure 1008. The shielding element (not shown) can be located on the top, on the bottom, or both on the top and bottom of the wireless charging area 1012. In the embodiment shown in FIG. 11, the transmit antenna 1007 can be implemented as a coil that surrounds the support structure 1008, and that is coupled to another coil (not shown in FIG. 11) forming the transmit antenna 1002 (FIG. 10), the transmit antennas 1002 and 1007 being located on two sides spanning the wireless charging area 1012.

In the exemplary embodiment shown in FIG. 11, the shielding elements are omitted for clarity; however, one or more shielding elements may be implemented above and/or below the transmit antenna 1007, or otherwise proximate to the transmit antenna 1007.

Figure 12:
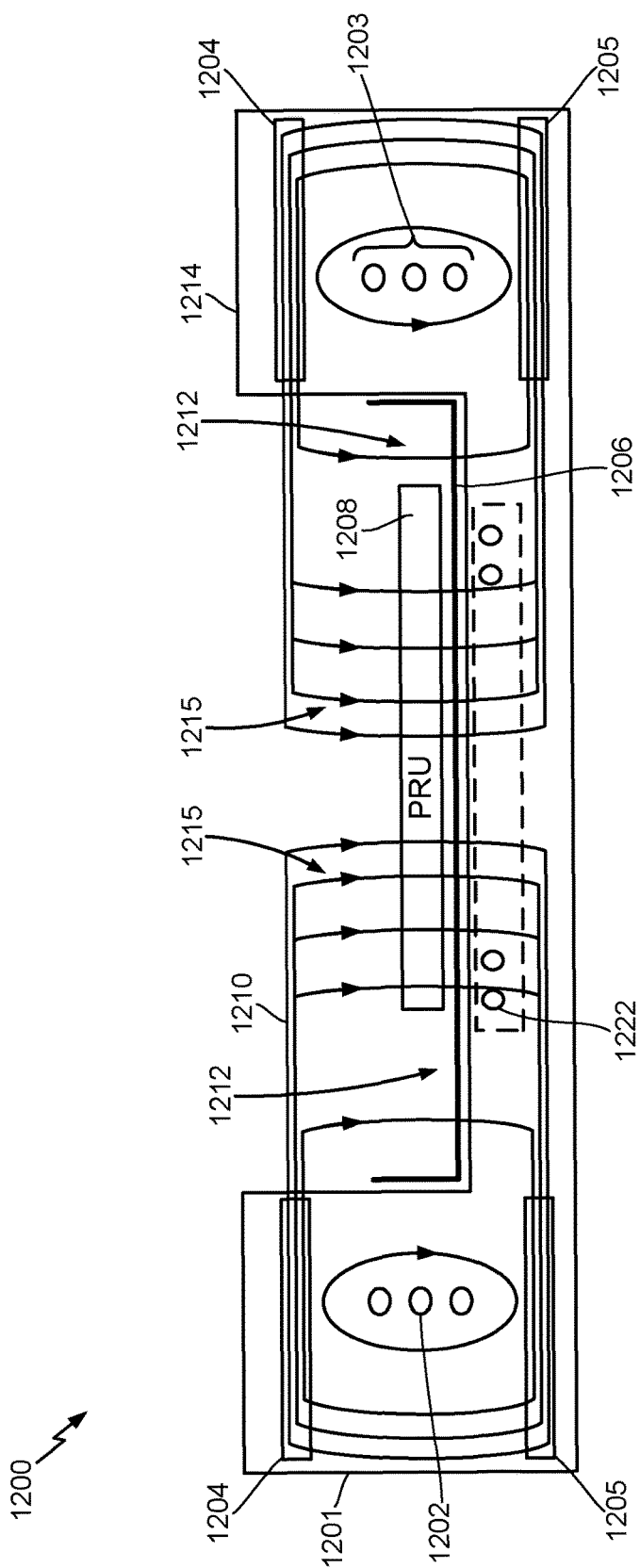
FIG. 12 is a cross-sectional schematic diagram of a wireless charging system showing an alternative exemplary embodiment of a shielded antenna for wireless charging.

FIG. 12 is a cross-sectional schematic diagram of a wireless charging system 1200 showing an alternative exemplary embodiment of a shielded antenna for wireless charging. The wireless charging system 1200 comprises a transmitter 1201 (also referred to as a power transmitting unit (PTU), and a receiver 1208 (also referred to as a power receiving unit (PRU). The transmitter 1201 comprises a transmit antenna 1202 comprising coils 1203. In an exemplary embodiment, the coils 1203 of the transmit antenna 1202 are vertically oriented and are located between shielding elements 1204 and 1205. However, the coils 1203 of the transmit antenna 1202 can be oriented other than that shown. In an exemplary embodiment, the shielding elements 1204 and 1205 may be similar to the shielding elements 704 and 705 described herein, and, in an exemplary embodiment, may comprise a ferrite material as described herein. Moreover, in an exemplary embodiment, while two shielding elements 1204 and 1205 are shown located above and below the transmit antenna 1202 in this exemplary embodiment, only one shielding element, either above or below the transmit antenna 1202, may be implemented. In an exemplary embodiment, the shielding elements 1204 and 1205 magnetically shield the coils 1203 of the transmit antenna 1202 and limit, or diminish, the strength of the magnetic field (H-field) 1210 that may be emitted from above and below the coils 1203 of the transmit antenna 1202. Locating the coils 1203 of the transmit antenna 1202 outside a periphery of and away from the wireless charging area 1212, and shielding the transmit antenna 1202 with one or more ferrite elements, reduces the amount of EMI radiation and RF radiation emitted from above and below the transmit antenna 1202, such that a moderate, yet sufficiently strong H-field 1210 is present within the wireless charging area 1212 to charge the receiver 1208, while the EMI radiation and RF radiation emitted from above and below the transmit antenna 1202 is minimized In an exemplary embodiment, the shielding elements 1204 and 1205 are used to magnetically shield the transmit antenna 1202 and to direct the H-field 1210 substantially laterally toward the wireless charging area 1212, thus minimizing the amount of EMI radiation and RF radiation emitted from the coils 1203 of the transmit antenna 1202 directly above and/or below the coils 1203. The number of coils or turns of the transmit antenna 1202 and the number of shielding elements located above and/or below, or otherwise proximate to the transmit antenna 702, determine the strength of the H-field 1210 within the wireless charging area 1212. In an exemplary embodiment, the coils 1203 of the transmit antenna 1202 are located outside of and positioned laterally away from the charging surface 1206 and the wireless charging area 1212, such that the coils 1203 of the transmit antenna 1202 completely surround, or enclose, the charging surface 1206 and the wireless charging area 1212. In an exemplary embodiment, the shielding elements 1204 and 1205 are located only above and below the coils 1203 and are not located in the wireless charging area 1212. In an exemplary embodiment, the receiver 1208, and by virtue of its being located within the receiver 1208, the receive antenna (not shown), are located completely within the periphery or circumference of the wireless charging area 1212 formed by the coils 1203 of the transmit antenna 1202.

In an exemplary embodiment, to increase the uniformity of the H-field 1210, particularly in an area 1215 in the wireless charging area 1212, an additional planar or solenoidal antenna 1222 can be incorporated into the transmitter 1201 near the charging surface 1206. To maintain low RF emission, the current in the additional antenna 1222 may be kept low with respect to the current in the transmit antenna 1202. However, even with a current in the additional antenna 1222 that may be less than the current in the transmit antenna 1202, the additional antenna 1222 may be configured to increase the H-field in the area 1215 so that an additional charging energy field may be generated and applied to a receiver 1208, while minimizing EMI and RF interference by allowing the diminished magnetic field to remain in the vicinity of the transmit antenna 1202. Either the shielding element 1204 or the shielding element 1205 may be omitted, depending on application.

In an exemplary embodiment, the receiver 1208 is shown as being located recessed below an upper surface 1214 of the transmitter 1201. However, in alternative exemplary embodiments, the upper surface 1214 may extend completely or partially over the transmitter 1201 and the receiver 1208 may be located over the upper surface 1214 of the transmitter 1201, but may still be located within a periphery formed by the transmit antenna 1202.

Figure 13:
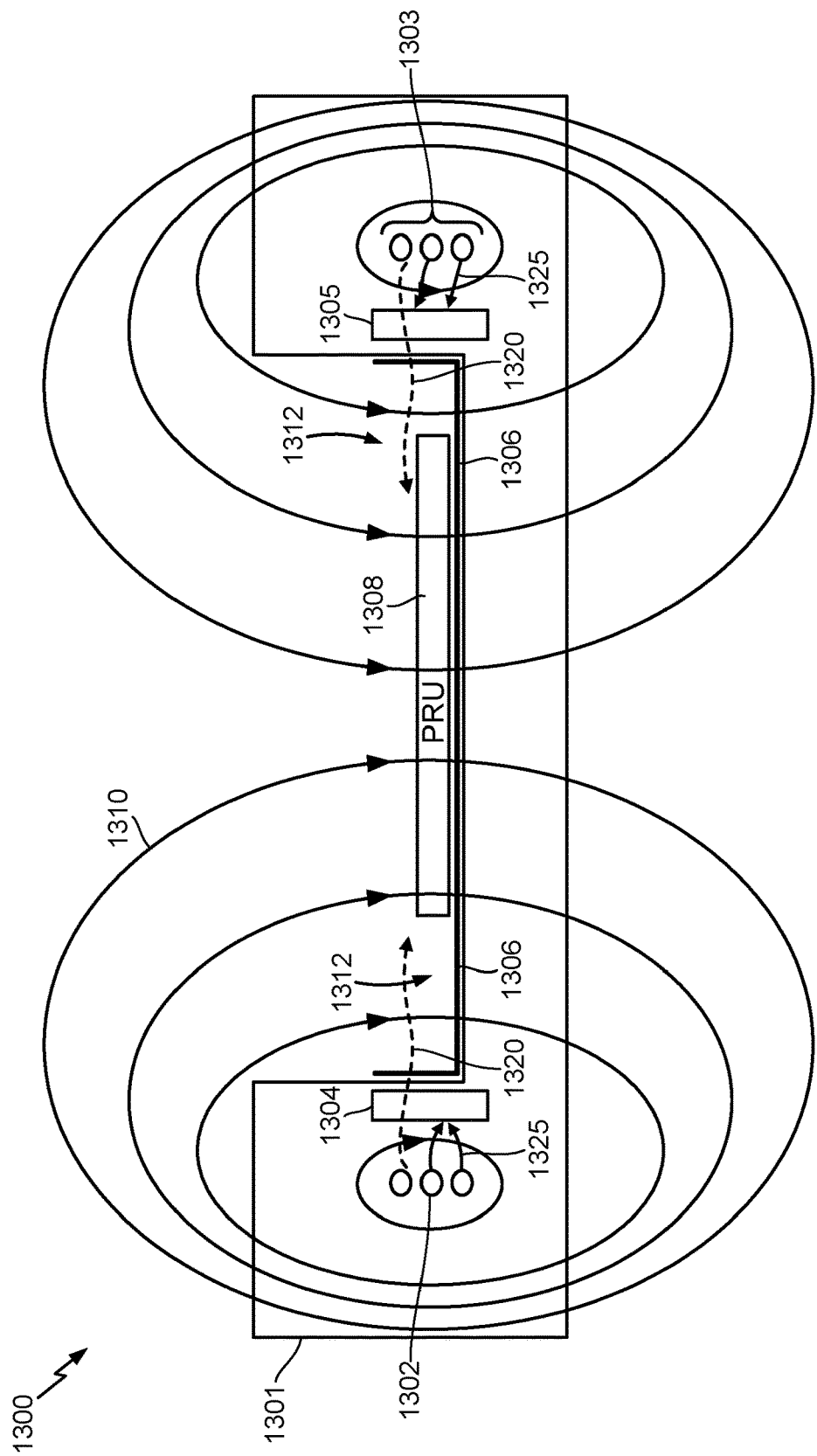
FIG. 13 is a cross-sectional schematic diagram of a wireless charging system showing an alternative exemplary embodiment of a shielded antenna for wireless charging.

FIG. 13 is a cross-sectional schematic diagram of a wireless charging system 1300 showing an alternative exemplary embodiment of a shielded antenna for wireless charging. The wireless charging system 1300 comprises a transmitter 1301 (also referred to as a power transmitting unit (PTU), and a receiver 1308 (also referred to as a power receiving unit (PRU). The transmit antenna 1302 comprises coils 1303. In an exemplary embodiment, the coils 1303 of the transmit antenna 1302 are vertically oriented and are located adjacent to shielding elements 1304 and 1305. However, the coils 1303 of the transmit antenna 1302 can be oriented other than that shown. While shown as two separate elements, the shielding elements 1304 and 1305 may comprise a single shielding element lining the inside of the transmit antenna 1302. In the embodiment shown in FIG. 13, the shielding elements 1304 and 1305 may comprise one or more electric field (E-field) shielding elements. In an exemplary embodiment in which it is desirable to provide electric field shielding, the shielding elements 1304 and 1305 may comprise metal or metallic elements. In an exemplary embodiment, the shielding elements 1304 and 1305 electrically shield the coils 1303 of the transmit antenna 1302 and limit, or diminish, the strength of the electric field (E-field) 1320 that may enter the wireless charging area 1312. In an exemplary embodiment, the dotted arrows illustrate an E-field 1320 that would enter the wireless charging area 1312 without the shielding elements 1304 and 1305. The solid arrows 1325 illustrate that in the presence of the shielding elements 1304 and 1305, the E-field 1320 is significantly diminished and does not enter the wireless charging area 1312. However, in this exemplary embodiment, the magnetic field 1310 remains undiminished by the shielding elements 1304 and 1305 and is present in the wireless charging area 1312 in sufficient strength to charge the receiver 1308.

In a near-field charging distance the transmit antenna 1302 primarily generates an H-field 1310, but also generates a strong E-field. The E-field may couple to electrical components of a receiver 1308, such as a touch screen or touch screen drive IC, display screen, display drive IC, etc., and cause undesirable effects. Therefore, to prevent electrical coupling of the E-field to the receiver 1308, the shielding elements 1304 and 1305 may be vertically oriented adjacent the coils 1303 of the transmit antenna 1302. In this manner, the E-field generated by the transmit antenna 1302 couples to the shielding elements 1304 and 1305 and does not couple to the receiver 1308.

Locating the coils 1303 of the transmit antenna 1302 outside a periphery of and away from the wireless charging area 1312, and shielding the transmit antenna 1302 with one or more metal shielding elements 1304 and 1305 diminishes the electric field that may couple to the receiver 1308. The metal shielding elements 1304 and 1305 diminish the electric field in the wireless charging area 1312 but do not affect the magnetic field 1310 so that the magnetic field 1310 in the wireless charging area 1312 remains undiminished and sufficiently strong to charge a receiver 1308 in the wireless charging area 1312.

In an exemplary embodiment, the coils 1303 of the transmit antenna 1302 are located outside of and positioned laterally away from the charging surface 1306 and the wireless charging area 1312, such that the coils 1303 of the transmit antenna 1302 completely surround or enclose the charging surface 1306 and the wireless charging area 1312. In an exemplary embodiment, the shielding elements 1304 and 1305 are located only adjacent coils 1303 and are not located in the charging region 1312. In an exemplary embodiment, the receiver 1308, and by virtue of its being located within the receiver 1308, the receive antenna (not shown), are located completely within the circumference formed by the coils 1303 of the transmit antenna 1302.

Figure 14:
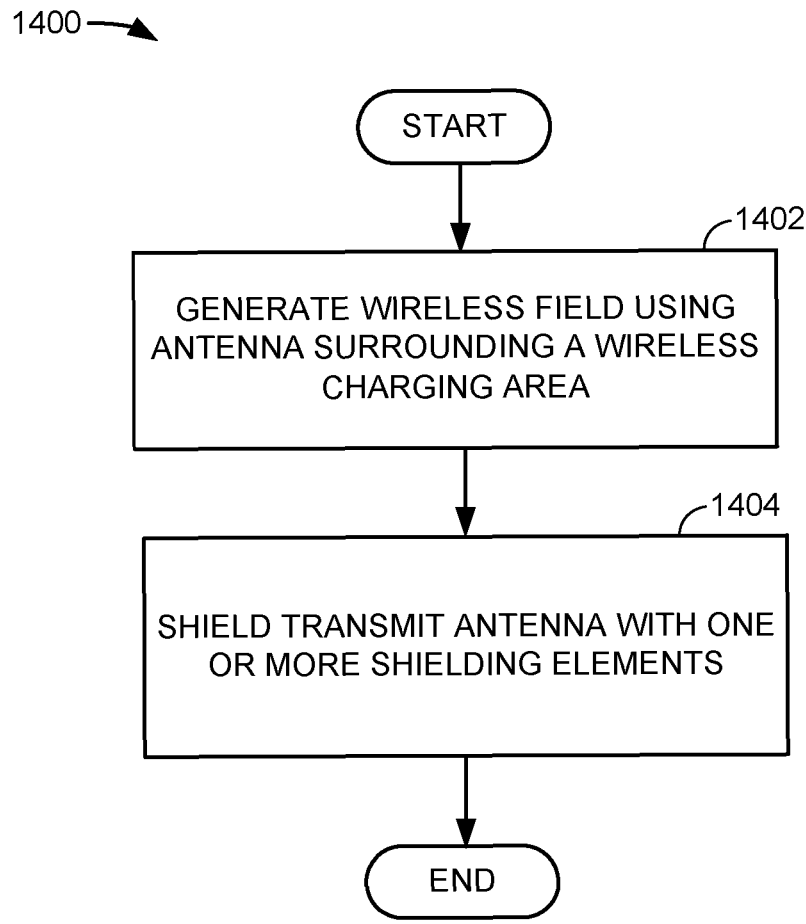
FIG. 14 is a flowchart illustrating an exemplary embodiment of a method for implementing a shielded antenna to reduce EMI and RF interference in a wireless power transfer system.

FIG. 14 is a flowchart 1400 illustrating an exemplary embodiment of a method for implementing a shielded antenna to reduce EMI and RF interference in a wireless power transfer system. The blocks in the method 1400 can be performed in or out of the order shown.

In block 1402, in an exemplary embodiment, a wireless field is generated using an antenna that surrounds a wireless charging area. For example, a transmit antenna such as the transmit antenna 702, can be located away from and surrounding a wireless charging area 712, a wireless charging area 1212, or a wireless charging area 1312.

In block 1404, the transmit antenna is shielded to reduce an amount of electromagnetic interference (EMI) and radio frequency (RF) interference emitted by the transmit antenna. For example, one or more shielding elements 704 and 705, comprising, for example, a ferrite material, may be located proximate to, adjacent, alongside, or otherwise in the vicinity of the coils 703 of the transmit antenna 702. Alternatively, one or more metal elements 1304 and 1305 may be located proximate to, adjacent, alongside, or otherwise in the vicinity of the coils 1303 of the transmit antenna 1302.

Figure 15:
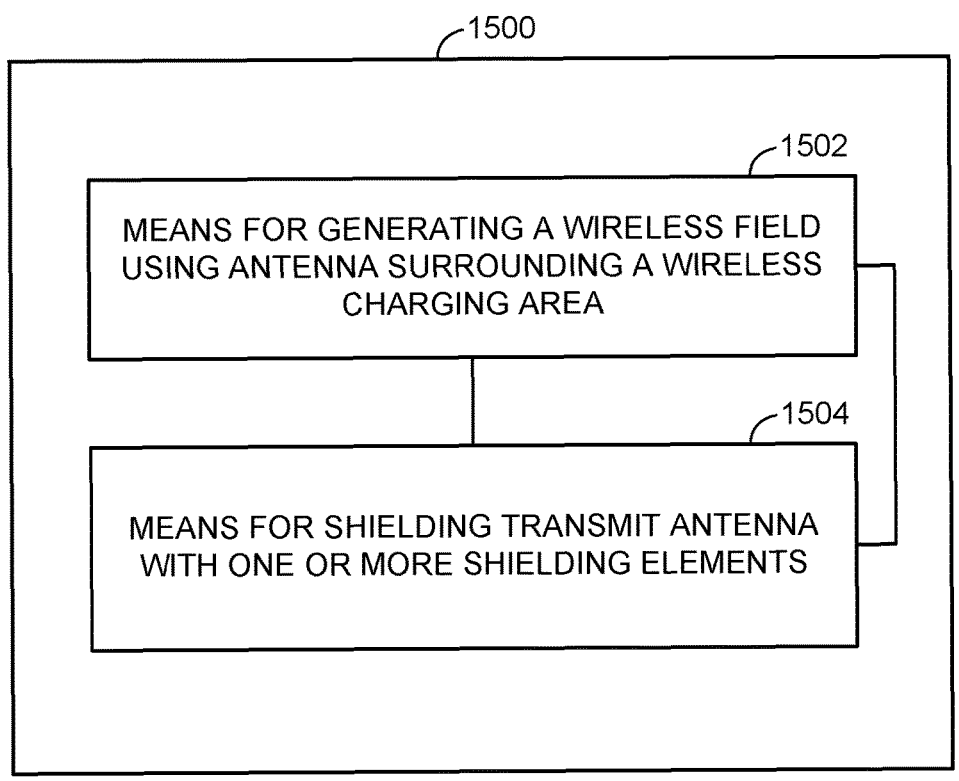
FIG. 15 is a functional block diagram of an apparatus for implementing a shielded antenna to reduce EMI and RF interference in a wireless power transfer system.

FIG. 15 is a functional block diagram of an apparatus 1500 for implementing a shielded antenna to reduce EMI and RF interference in a wireless power transfer system.

The apparatus 1500 comprises means 1502 for generating a wireless field using an antenna that surrounds a wireless charging area. In certain embodiments, the means 1502 for generating a wireless field using an antenna that surrounds a wireless charging area can be configured to perform one or more of the function described in operation block 1402 of method 1400 (FIG. 14). In an exemplary embodiment, the means 1502 for generating a wireless field using an antenna that surrounds a wireless charging area may comprise the structure shown in any of FIG. 7 through FIG. 13.

The apparatus 1500 further comprises means 1504 for shielding a transmit antenna to reduce an amount of electromagnetic interference (EMI) and radio frequency (RF) interference emitted by the transmit antenna. In certain embodiments, the means 1504 for shielding a transmit antenna to reduce an amount of electromagnetic interference (EMI) and radio frequency (RF) interference emitted by the transmit antenna can be configured to perform one or more of the function described in operation block 1404 of method 1400 (FIG. 14). In an exemplary embodiment, the means 1504 for shielding a transmit antenna to reduce an amount of electromagnetic interference (EMI) and radio frequency (RF) interference emitted by the transmit antenna may comprise the structure shown in any of FIG. 7 through FIG. 13.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. An apparatus for wireless power transfer, the apparatus comprising:
    a transmit antenna configured to generate a wireless field to power or charge a load;
    a wireless charging area configured to receive a device to be wirelessly charged via the wireless field, the transmit antenna located outside of a periphery of the wireless charging area;
    at least one shielding element overlapping the transmit antenna on a side of the transmit antenna from which the device is configured to be positioned within the wireless charging area, the at least one shielding element configured to diminish at least a portion of the wireless field such that the wireless field in the wireless charging area is stronger than the wireless field where the at least one shielding element overlaps the transmit antenna; and
    an additional transmit antenna associated with the wireless charging area, the additional transmit antenna configured to increase a strength of the wireless field in the wireless charging area while allowing a diminished wireless field to remain where the at least one shielding element overlaps the transmit antenna.

2. The apparatus of claim 1, wherein the transmit antenna comprises a single coil surrounding the wireless charging area.

3. The apparatus of claim 1, wherein the transmit antenna comprises two series-coupled coils spanning the wireless charging area.

4. The apparatus of claim 1, wherein the transmit antenna comprises two parallel-coupled coils spanning the wireless charging area.

5. The apparatus of claim 1, wherein the transmit antenna comprises a vertically oriented coil having windings that are stacked on top of each other in separate planes.

6. The apparatus of claim 1, wherein the at least one shielding element is located away from the wireless charging area.

7. The apparatus of claim 1, wherein the shielding element is a magnetic field shielding element.

8. The apparatus of claim 1, wherein the shielding element is an electric field shielding element.

9. The apparatus of claim 7, wherein the magnetic field shielding element comprises a ferrite material located one of above and below the transmit antenna.

10. The apparatus of claim 7, wherein the magnetic field shielding element comprises a ferrite material located above and below the transmit antenna.

11. The apparatus of claim 8, wherein the electric field shielding element comprises a metal material located adjacent the transmit antenna.

12. The apparatus of claim 8, wherein the electric field shielding element diminishes an electric field in the wireless charging area while allowing a magnetic field to remain undiminished in the wireless charging area.

13. A device for wireless power transfer, comprising:
    means for generating a wireless field to power or charge a load in a wireless charging area;
    means for receiving a device to be wirelessly charged via the wireless field;
    means for diminishing at least a portion of the wireless field outside of the wireless charging area such that the wireless field in the wireless charging area is stronger than the wireless field outside of the wireless charging area; and means for increasing a strength of the wireless field in the wireless charging area while allowing a diminished wireless field to remain outside of the wireless charging area.

14. The device of claim 13, wherein the means for diminishing at least a portion of the wireless field outside of the wireless charging area comprises means for diminishing a magnetic field.

15. The device of claim 13, wherein the means for diminishing at least a portion of the wireless field outside of the wireless charging area comprises means for diminishing an electric field.

16. The device of claim 13, wherein the means for diminishing at least a portion of the wireless field outside of the wireless charging area comprises means for diminishing an electric field and means for allowing a magnetic field to remain undiminished.

17. An apparatus for wireless power transfer, the apparatus comprising:

a transmit coil configured to generate a wireless field to power or charge a load;

a wireless charging area configured to receive a device to be wirelessly charged via the wireless field, the transmit coil located outside of a periphery of the wireless charging area;

at least one shielding element covering the transmit coil on at least one side of the transmit coil, the one side of the coil corresponding to a side from which receiver devices will be positioned within the wireless charging area; and an additional transmit coil associated with the wireless charging area, the additional transmit coil configured to increase a strength of the wireless field in the wireless charging area while allowing a diminished wireless field to remain outside of the wireless charging area.

18. The apparatus of claim 17, wherein the at least one shielding element comprises a first ferrite element located above the transmit coil and a second ferrite element located below the transmit coil.

19. The apparatus of claim 17, wherein the at least one shielding element is configured to magnetically shield the transmit coil to diminish at least a portion of the wireless field outside of the wireless charging area such that the wireless field in the wireless charging area is stronger than the wireless field outside of the wireless charging area.

* * * * *